US012621224B2

(12) United States Patent
Marwah et al.

(10) Patent No.: US 12,621,224 B2
(45) Date of Patent: May 5, 2026

(54) ABSTRACTING NETWORK TRAFFIC AS VIDEO FOR REPRESENTATION LEARNING

(71) Applicant: MICRO FOCUS LLC, Santa Clara, CA (US)

(72) Inventors: Manish Marwah, Pleasanton, CA (US); Martin Fraser Arlitt, Calgary (CA)

(73) Assignee: Micro Focus LLC, Santa Clara, CA (US)

( * ) Notice: Subject to any disclaimer, the term of this patent is extended or adjusted under 35 U.S.C. 154(b) by 391 days.

(21) Appl. No.: 18/165,860

(22) Filed: Feb. 7, 2023

(65) Prior Publication Data

US 2024/0267307 A1     Aug. 8, 2024

(51) Int. Cl.
| | |
|---|---|
| *H04L 43/026* | (2022.01) |
| *G06V 20/40* | (2022.01) |
| *H04L 43/028* | (2022.01) |
| *H04L 65/61* | (2022.01) |

(52) U.S. Cl.
CPC ............ *H04L 43/026* (2013.01); *G06V 20/41* (2022.01); *G06V 20/47* (2022.01); *H04L 43/028* (2013.01); *H04L 65/61* (2022.05)

(58) Field of Classification Search
CPC ..... H04L 43/026; H04L 65/61; H04L 43/028; G06V 20/41; G06V 20/47
USPC ......................................................... 370/252
See application file for complete search history.

(56) References Cited

U.S. PATENT DOCUMENTS

| | | | | |
|---|---|---|---|---|
| 10,432,653 | B2 * | 10/2019 | Sim | ......................... G06V 10/82 |
| 2016/0283859 | A1 * | 9/2016 | Fenoglio | ................. H04L 43/04 |
| 2019/0238405 | A1 * | 8/2019 | Karivaradaswamy | .. G06F 13/10 |
| 2022/0067484 | A1 * | 3/2022 | Karin | ....................... G06N 3/09 |

FOREIGN PATENT DOCUMENTS

| | | |
|---|---|---|
| CN | 107733937 A | 2/2018 |
| KR | 101953672 B1 | 3/2019 |

OTHER PUBLICATIONS

"Convolutional neural network," Wikipedia, as of Oct. 19, 2022, 34 pages [retrievedonline May 4, 2023 from: en.wikipedia.org/w/index. php?title=Convolutional_neural_network&oldid=1.
"Exif," Wikipedia, as of Oct. 22, 2022, 12 pages [retrieved online May 4, 2023 from: https://en.wikipedia.org/w/index.php?title=Exif &oldid=1117538679].

(Continued)

*Primary Examiner* — Hermon Asres
(74) *Attorney, Agent, or Firm* — Sheridan Ross P.C.

(57) ABSTRACT

A plurality of captured packets are received. The plurality of captured packets are from a plurality of packet flows. A packet flow is a communication session between two devices. For example, a packet flow may be a communication session between a client and a server. The plurality of captured packets are sorted into individual packet flows. The individual packet flows are converted into individual videos. For example, each packet from each packet flow is stored as a separate video frame in an individual video. A machine learning algorithm is applied to the individual videos to perform analytic tasks on the individual videos. For example, the machine learning algorithm may be used to identify anomalies within a packet flow and/or between packet flows.

20 Claims, 6 Drawing Sheets

(56) References Cited

OTHER PUBLICATIONS

"Video synopsis," Wikipedia, as of Sep. 12, 2022, 3 pages [retrieved online May 4, 2023 from: https://en.wikipedia.org/w/index.php?title=Video_synopsis&oldid=1109811200].

Kim et al. "CNN-Based Network Intrusion Detection against Denial-of-Service Attacks," Electronics, 2020, vol. 9, Article 916, 21 pages.

Wang et al. "Malware Traffic Classification Using Convolutional Neural Network for Representation Learning," IEEE, 2017, 2017 International Conference on Information Networking (ICOIN), pp. 712-717.

* cited by examiner

ABSTRACTING NETWORK TRAFFIC AS VIDEO FOR REPRESENTATION LEARNING

BACKGROUND

Systematically extracting actionable information from network traffic data is key in addressing many important cybersecurity problems, such as intrusion and malware detection, and for network management problems, such as application and device identification. A major challenge in building machine learning models for these applications is manually engineering features from network traffic data, which is voluminous, heterogeneous (e.g., may contain IP addresses, MAC addresses, port numbers, categorical and numerical values, etc.), and dynamic (e.g., there is a continuous initiation and termination of flows between hosts).

SUMMARY

These and other needs are addressed by the various embodiments and configurations of the present disclosure. The present disclosure can provide a number of advantages depending on the particular configuration. These and other advantages will be apparent from the disclosure contained herein.

A plurality of captured packets are received. The plurality of captured packets are from a plurality of packet flows. A packet flow is a communication session between two devices. For example, a packet flow may be a communication session between a client and a server. The plurality of captured packets are sorted into individual packet flows. The individual packet flows are converted into individual videos. For example, each packet from each packet flow is stored as one or more video frames in an individual video. A machine learning algorithm is applied to the individual videos to classify the individual videos. For example, the machine learning algorithm may be used to identify anomalies within a packet flow and/or between packet flows.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", and "A, B, and/or C" and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
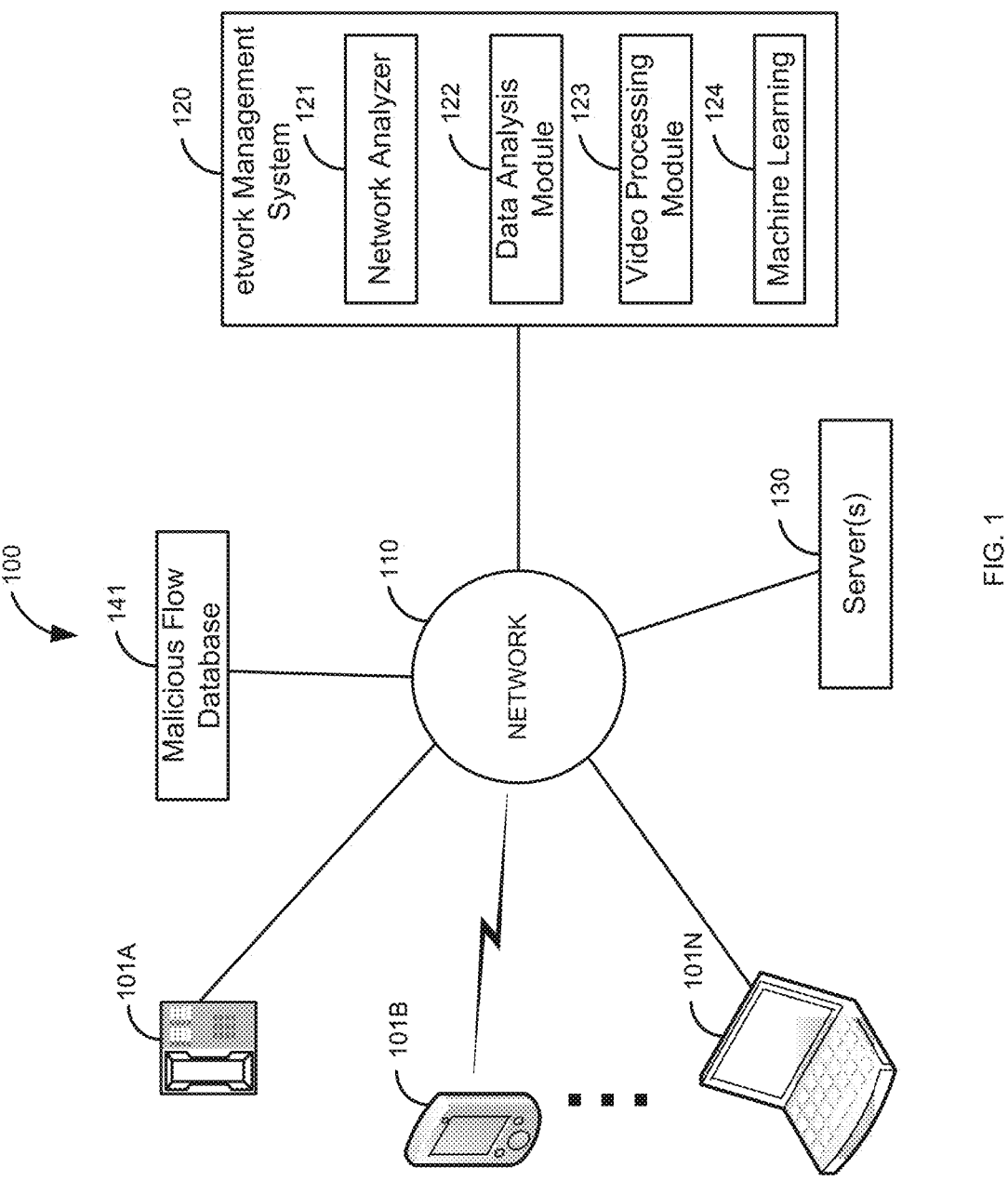
FIG. 1 is a block diagram of a first illustrative system for abstracting network traffic as a video.

FIG. 1 is a block diagram of a first illustrative system 100 for abstracting network traffic as a video. The first illustrative system 100 comprises communication devices 101A-101N, a network 110, a network management system 120, server(s) 130, and a malicious flow database 141.

The communication devices 101A-101N can be or may include any device that can communicate on the network 110, such as a Personal Computer (PC), a telephone, a video system, a cellular telephone, a Personal Digital Assistant (PDA), a tablet device, a notebook device, a smartphone, an embedded device, an Internet of Things (IoT) device, and/or the like. As shown in FIG. 1, any number of communication devices 101A-101N may be connected to the network 110, including only a single communication device 101.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), Session Initiation Protocol (SIP), Domain Naming Service (DNS), and/or the like. Thus, the network 110 is an electronic communication network configured to carry messages via packets and/or circuit switched communications.

The network management system 120 can be any system to manage/monitor the network 110, such as a network monitoring system, a packet monitoring system, and/or the like. The network management system 120 further comprises a network analyzer 121, a data analysis module 122, a video processing module 123, and machine learning 124.

The network analyzer 121 can be any device/software that can capture packets from the network 110, such as, a protocol analyzer, a packet analyzer, and/or the like.

The data analysis module 122 can be or may include any hardware coupled with software that can analyze packet data. For example, the data analysis module 122 may analyze packet data captured by the network analyzer 121.

The video processing module 123 can be or may include any hardware coupled with software that can analyze video data. The video data may include video data in different formats/frame sizes.

The machine learning 124 may be any type of machine learning 124 that is used to analyze/compare video data/frames. The machine learning 124 may use a supervised machine learning model, a semi-supervised machine learning model, an unsupervised machine learning model, a self-supervised machine learning model, a clustering algorithm, and/or the like. The machine learning 124 may be used by the video processing module 123 to analyze the video data. The machine learning 124 can generate output results. For example, the output results of the machine learning 124 may be a report that is sent to a Security Operations Center (SOC) analyst, or a remedial action may be taken if a flow related to the machine learning 124 is considered malicious.

The server(s) 130 can be any type of server 130 that is used by the communication devices 101A-101N, such as, a web server, an application server, a database server, and/or the like. The server(s) 130 may support various services/applications, such as, security services, financial services, web services, social networks, email services, cloud-based services, database services, and/or the like. The server(s) 130 generates packet data while communicating with the communication devices 101A-101N, which can then be captured by the network analyzer 121.

The malicious flow database 141 can be any type of database that is used to store data/video data of malicious packet flows. For example, the malicious flow database 141 can store malicious flow data that was previously captured on the network 110 (or from another network 110). Packets of a malicious flow may be stored as frames of a video in the malicious flow database 141.

Figure 2:
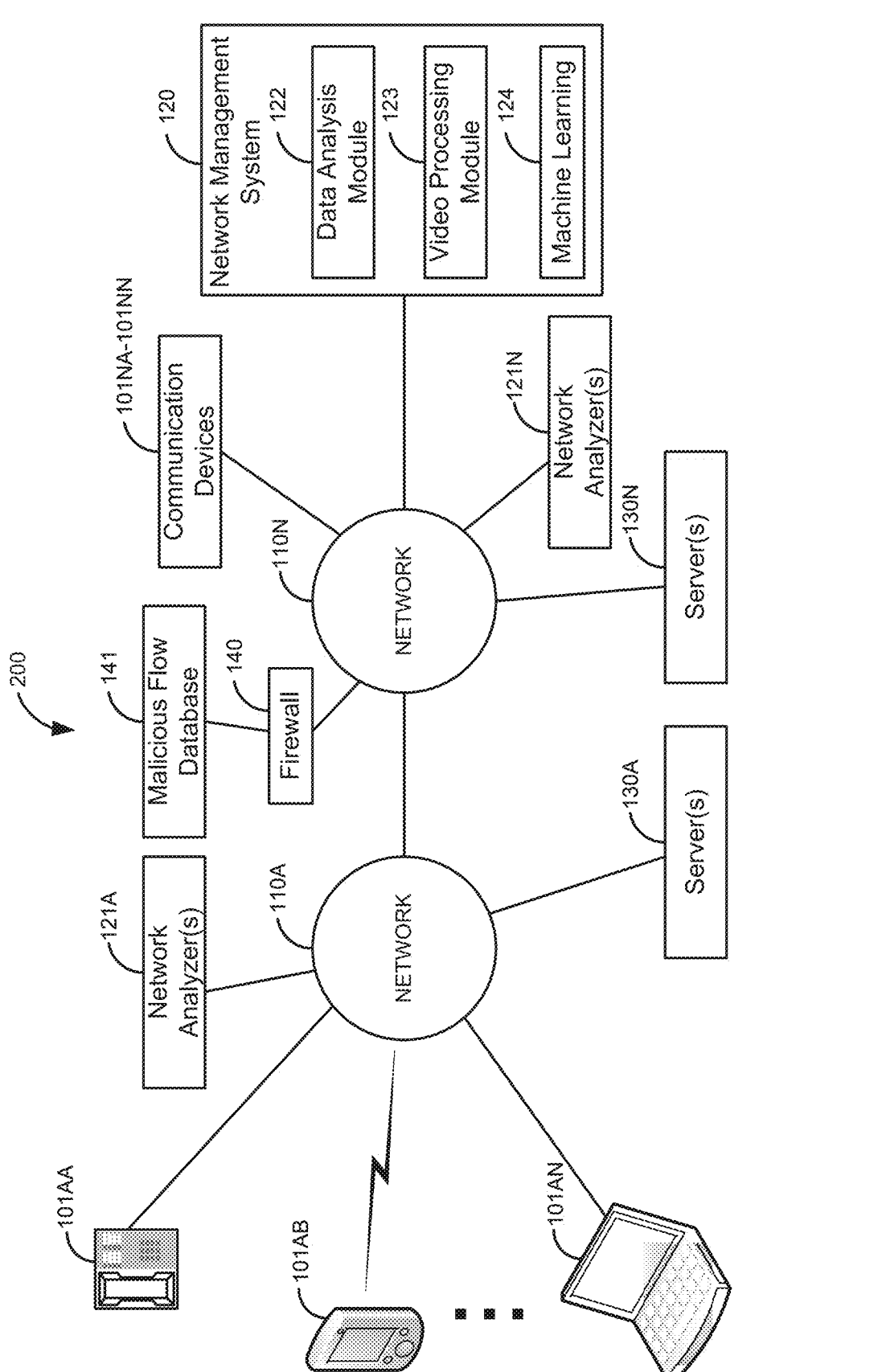
FIG. 2 is a block diagram of a second illustrative system for abstracting network traffic as a video.

FIG. 2 is a block diagram of a second illustrative system 200 for abstracting network traffic as a video. The second illustrative system 200 comprises communication devices 101AA-101AN and 101NA-101NN, networks 110A-110N, the network management system 120, network analyzers 121A-121N, servers 130A-130N, a firewall 140, and the malicious flow database 141.

The communication devices 101AA-101AN and 101NA-101NN are similar to the communication devices 101A-101N. The networks 110A-110N may comprise different networks of an entity, such as, a corporation, an organization, and/or the like. The network management system 120, in FIG. 2 is the same as the network management system 120 of FIG. 1 with the exception of not having a network analyzer 121. However, the network management system 120 of FIG. 2 may also comprise a network analyzer 121. The networks 110A-110N each have one or more network analyzers 121A-121N.

The firewall 140 is an interface to an external network 110 (not shown). The firewall protects the networks 110A-110N from malicious actors. The external network includes the malicious flow database 141.

Figure 3:
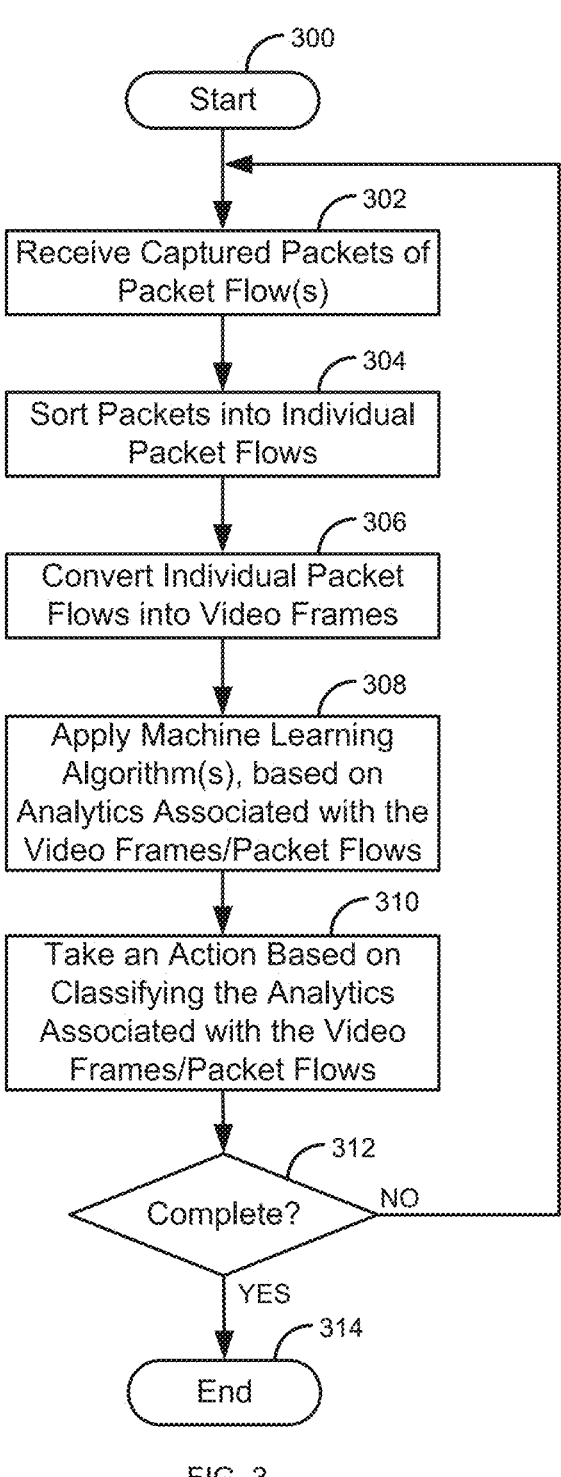
FIG. 3 is a flow diagram of a process for abstracting network traffic as a video.

FIG. 3 is a flow diagram of a process for abstracting network traffic as a video. Illustratively, the communication devices 101A-101N, 101AA-101AN, and 101NA-101NN, the network management system 120, the network analyzers 121/121A-121N, the data analysis module 122, the video processing module 123, the machine learning 124, the server(s) 130/130A-130N, the firewall 140, and the malicious flow database 141 are stored-program-controlled entities, such as a computer or microprocessor, which performs the method of FIGS. 3-6 and the processes described herein by executing program instructions stored in a computer readable storage medium, such as a memory (i.e., a computer memory, a hard disk, and/or the like). Although the methods described in FIGS. 3-6 are shown in a specific order, one of skill in the art would recognize that the steps in FIGS. 3-6 may be implemented in different orders and/or be implemented in a multi-threaded environment. Moreover, various steps may be omitted or added based on implementation.

The process starts in step 300. The network analyzer(s) 121 capture packets of one or more packet flows in step 302. A packet flow is a number of packets sent between two or more devices. For example, the network analyzer 121 may capture a packet flow between the communication device 101A and the server 130 for a specific communication session (e.g., a Transmission Communication Protocol (TCP) communication session). The packet flow may be across different networks 110A-110N. For example, the network analyzers 121A-121N may capture a packet flow between the communication device 101AN and the server 130N. The data analysis module 122 sorts packets into individual packet flows in step 304. For example, the data analysis module 122 may identify/sort a packet flow based on an Internet Protocol (IP) address, based on a port number, based on a Media Access Control (MAC) address, based on a Global Unique Identifier (GUID), based on a connection number, based on a phone number, and/or the like. The packet flow created from the network packets are not independent, since packets in a flow are temporally dependent. In one embodiment a packet flow may be identified based on a 5-tuple: source IP address, source port, destination IP address, destination port, protocol (e.g., a TCP connection).

The data analysis module 122 converts the individual packet flows into video frames in step 306. The video frames are created from the captured network packets. In one embodiment, each packet is converted to a separate video frame. In this embodiment, each frame may be a fixed size. For example, a frame size of 40×40 pixels (i.e., 1,600 total pixels) could be used, since most packets are less than 1,500 bytes in length.If jumbo packets are in use (i.e., more than 9K bytes), a larger frame size may be selected. For example, a size of 100×100 pixels could be used. Other aspect ratios may also be used for the frame; ideally, the total number of pixels should exceed the maximum packet size seen in a flow. The process may use larger sizes with padding.

In this embodiment, the bytes of a packet are mapped linearly along the rows of the frame, starting in the first row, and then filling in the subsequent rows from top to bottom. In another embodiment, the packet could be mapped to a frame column-wise instead of row-wise. Since each byte can have values 0 through 255, each pixel will have a corresponding range as well. In one embodiment, the value could be assumed to be the gray scale value of a pixel. However, color values could just as easily be used. If a packet has fewer bytes than the total number of pixels (say, 1,600), the remaining pixels may be set to zero (or the color black in the frame). However, the process could use any type of recognizable values for the unused bytes. If a packet has more bytes than the selected frame size can hold, the packet may be split into multiple frames.

Typically, there will be leftover pixels after converting a packet into a video frame. These extra bytes may be used to save a cryptographic hash of the packet. The cryptographic hash allows for the future verification of the contents of a packet; that is, to confirm that the contents of the frame have not been modified in any way. The cryptographic hash, while stored in the frame, may not be displayed in the video frame; in other words, the video processing module 123 may strip the hash before displaying it or processing it for any analytic or viewing task.

The video processing module 123 uses the machine learning 124 based on analytics applied to the video frames/packet flows to classify/analyze the individual packet flows in step 308. Neural network architectures (primarily ones based on convolutional neural networks) for processing frame and video data have matured significantly, to the extent that these architectures when trained on large amounts of data in many cases produce results that match human perception capabilities. These video processing techniques can now be applied to packets flows that are stored as video frames in a video.

The generated videos can be used for representation learning. The learned embeddings of the videos can be used for tasks such as: 1) Packet flow classification or clustering: the corresponding video representations can be used to learn a classifier, or to cluster; 2) Anomaly detection in flows: anomalous flows can be detecting by leveraging anomaly detection in the videos; this can be identifying anomalous frames within a video, or identifying entire videos as anomalous; 3) k-most similar flows: given a video, finding the k-most similar videos to it; this can be useful to a Security Operations Center (SOC) analyst—on finding an unusual flow, they can search in historical data to check out similar flows if they exist; 4) Generating flows: the video representation of flows can be used to train generative machine learning models, which can then generate similar videos; these synthetic videos can be converted back to network packets to generate synthetic network traffic data. One or more of these may be performed in step 308.

Another video analytic operation that can be applied to the network flow videos is video summarization (also called video synopsis). This is a broad area of research in computer vision where the objective is to reduce a long video to a very short one that captures important content. The simplest approach is to only keep frames with the largest changes. This would be especially relevant to longer flows where most of the communication is repetitive (e.g., a watchdog sending heartbeats, or an abstracted client-server communication where the video frames capture requests and responses but without detailed content information). In such cases, as most of the frames will be similar, video summarization could very compactly represent the flow in a small number of frames. Such video frames could then be shared with other locations or stored in the malicious flow database 141 as summaries of behavior without needing to share the flows themselves. For example, these behaviors could be related to scanning activity, or some other malicious behavior in the network traffic. Depending on the granularity of transformation between network bytes and pixels, this will provide differing privacy/accuracy-of-match trade-offs. Further, this could be a more scalable way of sharing network behavior information. Such behavior summaries could also help in detecting changes in these behaviors over time.

Since the videos capture all the network traffic data, they facilitate deep packet inspection. In cases where network traffic data is encrypted, only network and transport layer header information will be accessible. Two main options are available in such cases: 1) in many enterprise settings, decryption keys are available, which can be used to decrypt the flows;) if decryption is not possible, the process may use only the packet header data to construct the videos, similar to shallow packet inspection.

The data analysis module 122 determines, in step 310, one or more actions to take based on the analytics associated with the video frames/packet flows. For example, the data analysis module 122 may notify an analyst, display information to the analyst, unload an application, block a port, and/or the like.

The video processing module 123 determines, in step 312, if the process is complete. If the process is not complete in step 312, the process goes back to step 302. Otherwise, if the process is complete in step 312, the process ends in step 314.

Figure 4:
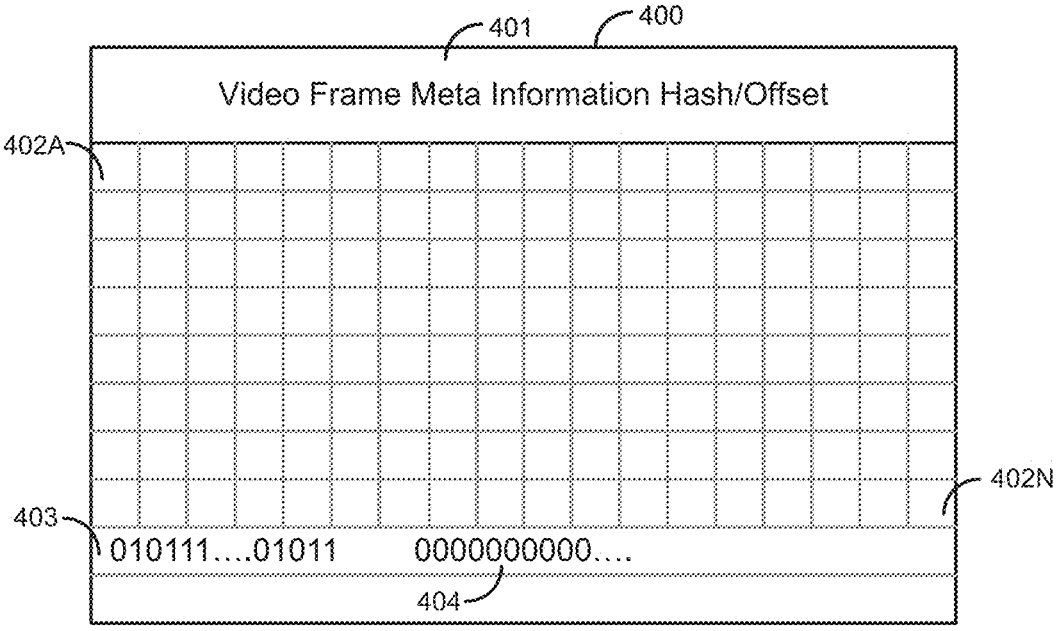
FIG. 4 is an exemplary video frame that is created using packet flow data.

FIG. 4 is an exemplary video frame 400 that is created using packet flow data. The video frame 400 is used to produce a video. The video frame 400 comprises metadata 401, frame bytes 402A-402N, an optional cryptographic hash 403, and padding 404.

The metadata 401 is related to the packet data. The metadata 401 may be arranged similar to the Exchangeable Image File Format (EXIF) information saved in several image/frame formats. In particular, this information may include: 1) the type of frame (e.g., whether it is the start of a flow or continuation of a flow); whether it is the start of a packet or continuation of a packet (e.g., if a packet takes up multiple frames 400); 2) presence of a cryptographic hash 403, and type of hash; 3) offset of the cryptographic hash if present. Further, metadata 401 related to the flow or network traffic could also be stored in the beginning of the frame 400, such as, a type of frame, a multiple frame packet indicator, a packet number, a cryptographic hash offset, failure information, packet header locations, an event, a Media Access (MAC) address, a network address, and/or the like.

The frame bytes 402A-402N are where the packet data is stored. The packet data may be stored directly as bytes, in a medium granularity format, in a course granularity format, and/or the like.

The cryptographic hash 403 is a hash of the frame 400 (e.g., up to the frame byte 402N). The cryptographic hash 403 is used to validate that the frame 400 has not become corrupted. The metadata 401 may include a type of cryptographic hash 403 (e.g., a type of hashing algorithm used). The padding 404 is data that is not filed by the packet data. In this example, the padding 404 is all zeros.

The frames 400 created from the packets are not independent, since packets in a flow are temporally dependent. A flow may consist of a 5-tuple: a source IP address, a source port, destination IP address, a destination port, a one or more protocols (e.g., a TCP/HTTP). All frames 400 corresponding to a flow are sequentially combined together to create a video. Flow related metadata 401 may be added to the frame 400 corresponding to that flow. Further, the cryptographic hash 403 can be added per frame, once for a sequence of frames, or once on the last frame for an entire video (flow).

Depending on the particular application, a video can capture a flow at different network layers. For example, a MAC layer flow will include the MAC headers, while an application layer flow may start with application layer headers (e.g., Hyper Text Transport Protocol (HTTP), Session Initiation Protocol (SIP), etc.). In general, videos can be constructed with the following layer types: 1) link layer (e.g., MAC), 2) network layer (e.g., IP), 3) Transport layer (e.g., TCP, UDP), and 4) application layer (e.g., HTTP, SIP, Domain Naming Service (DNS), etc.).

In one embodiment, each layer may start at a fixed location in the frame 400. This allows the different layers to start at the same place when displayed to a user even though the header size may vary. Thus, if a protocol header varies between packets, the start position for each protocol header will be in the same place. In this embodiment, the padding 404 may also be between different protocol headers in the frame 400. The fixed size for a header may be based on the minimum/maximum header size for the specific protocol.

Figure 6:
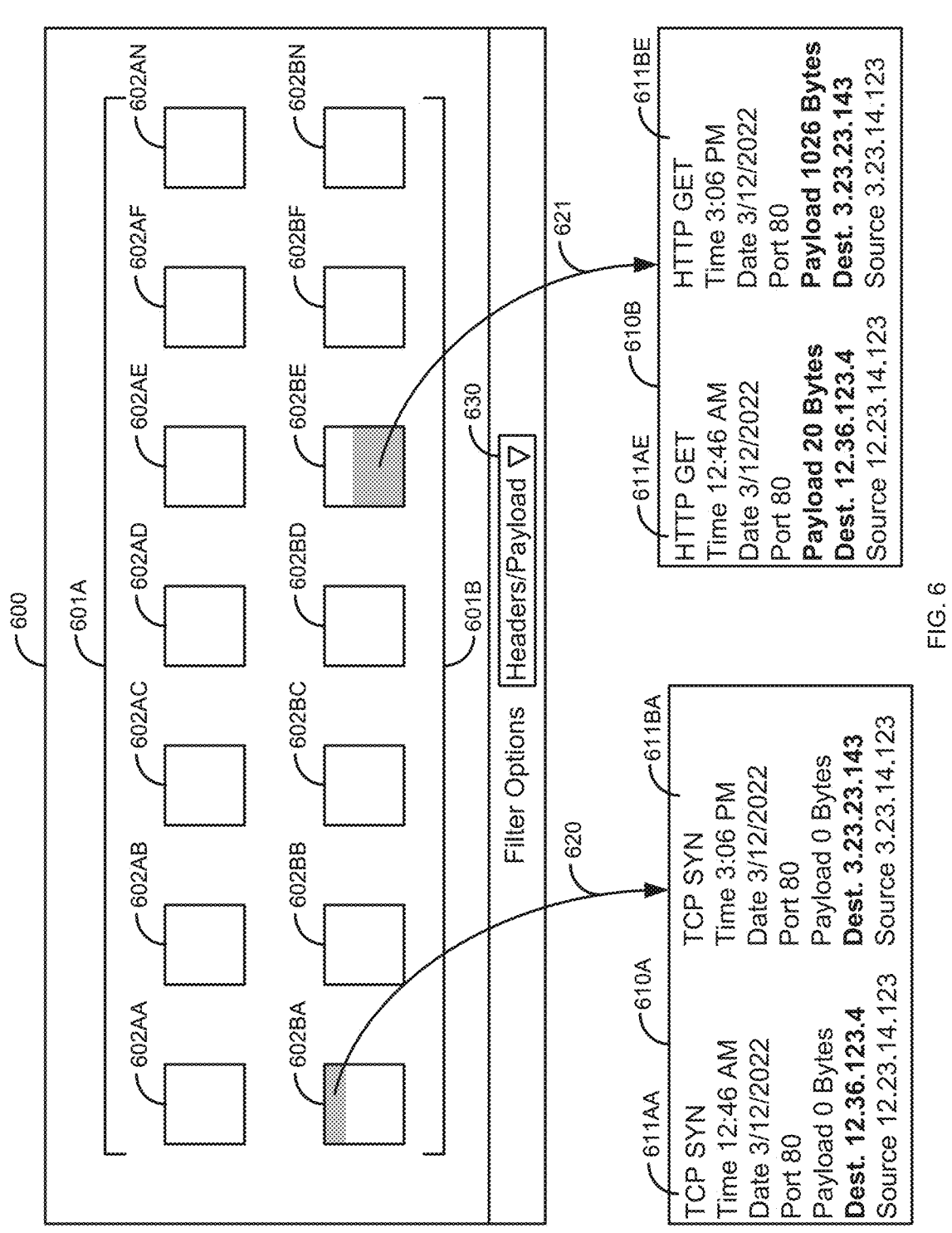
FIG. 6 is a diagram of an exemplary user interface that compares packet flows that have been converted to video.

This allows for consistent display of corresponding information as described in FIG. 6.

Figure 5:
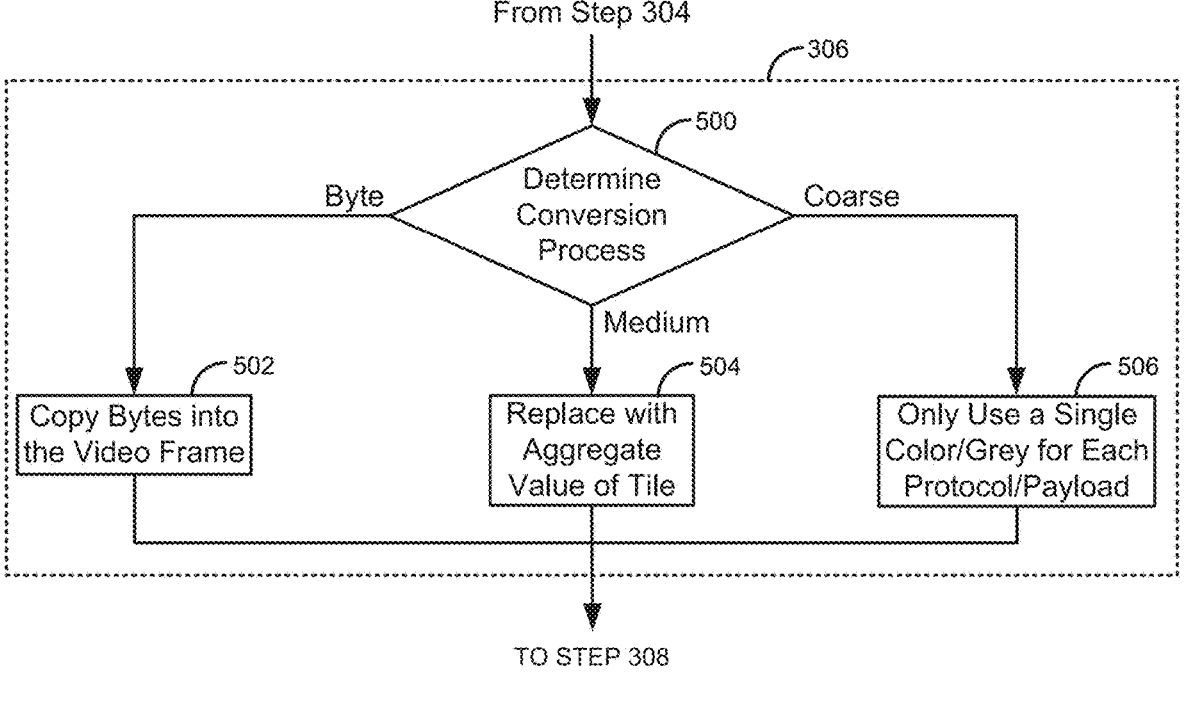
FIG. 5 is a flow diagram of a process for determining a conversion process used to abstract network traffic as a video.

FIG. 5 is a flow diagram of a process for determining a conversion process used to abstract network traffic as a video/frame. FIG. 5 is an exemplary embodiment for step 306 of FIG. 3. After sorting packets into individual flows in step 304, the video processing module 123 determines, in step 500, a conversion process to be used in creating the frame 400. The conversion process may be administered, based on rules, machine learned, and/or the like. If the conversion process is based on bytes in step 500, as discussed above, pixels get their values directly from packet bytes where the packet data is copied directly into the frame 400 in step 502. This is the most fine-grained representation of the packet bytes, that is, no information is lost. In other words, each byte of the packet is represented by a corresponding pixel in the frame 400.

If the conversion process is coarse in step 500, the video processing module 123 uses only a single color/grey scale for each protocol/payload in step 506. Coarse-grained conversion allows for higher level categorization and matching of flows. This transformation only discriminates between individual headers and payload. Thus, only a few shades, (e.g., two shades of gray (or two colors)) are used. Based on the intended layer level for the capture, the headers could be at network, transport, application layers (or any layer). Flows with similar protocols and similar payload lengths will tend to match. This lossy transformation results in videos with the highest level of abstraction. The resulting flow videos can be compressed and serve as signatures for those flows.

If the conversion process is medium in step 500, the video processing module 123 uses an aggregate value for each tile in step 504. In this conversion, the video processing module 123 performs some variant of pooling (e.g., max pooling). When applied to frames 400, pooling reduces the size of a frame 400 by replacing a k×k tile with an aggregate value of the tile (e.g., max pooling picks the max value). In this case, video processing module 123 considers a flow to be a 1-D stream, and pools over a sequence of bytes. The video processing module 123 may use content-aware pooling, where the pooling operator would depend on the content, that is, if the content is a header or payload. Within the payload, it would depend on the type of data contained. The process distinguishes between two modalities of content in the payload: 1) text, and 2) binary. For text, a pooling operator could map each word onto a pixel, a command, or a line, or a sentence into a pixel. For binary data, the entire contiguous binary sequence could be mapped to a small, potentially fixed-number of pixels, e.g., representing its length, or something more complex could be done if it is known what the binary content is. For example, if the content is an image, that 2-D max pooling can be performed; if the content is audio, a pooling operator specific to audio content can be applied. In general, some pooling functions that can be applied are: max pooling, average pooling, softmax pooling, attention pooling, and/or the like. If network traffic is encrypted, then only header data is used.

While the process of step 500 is shown as a decision block where a single conversion process is used. In one embodiment, based on defined rules, multiple conversions may take place in parallel. For example, a byte and medium conversion may be completed in parallel for the same packet flow. In one embodiment, all three conversions may take place in parallel for the same packet flow.

Once the conversion process is completed in steps 502, 504, and/or 506, the process then goes to step 308 where the video processing algorithms are used to preform analytics on the video frames 400/packet flows.

FIG. 6 is a diagram of an exemplary user interface 600 that compares packet flows that have been converted to video. The user interface 600 is used to display videos of packet flows to a user/administrator. For example, when an anomaly is detected within the video frames 400/packet flows the user interface is displayed. The user interface 600 comprises video flows 601A-601B and filter options selector 630.

The video flows 601A-601B represent two packet flows between the same devices at different times. However, the packet flows are not limited in this way. For example, there may be two devices that are expected to communicate in an expected way, except that there is a situation where the two devices don't communicate when they are expected to communicate. The video flow 601A comprises display frames 602AA-602AN. The video flow 601B comprises display frames 602BA-602BN. The display frames 602AA-602AN/602BA-602BN are where the frames 400 are displayed like traditional frames of a video where the individual packets are shown using colors/grey scale. Thus, a user can visually see differences between flows/frames 400. For example, the user could visually identify potential differences based on differences between different frames 400.

Based on the differences, the user may select a spot on a particular display frame 602 to show the actual differences. For example, as shown in FIG. 6, if the user selects the grey potion of the display frame 602BA in step 620, the difference window 610A is displayed. The difference window 610A shows the differences between the frames 602AA and 602BA in panels 611AA/611BA. The key differences may be highlighted as shown in the difference windows 610A is that the destination IP address has changed from 12.36.123.4 to 3.23.23.143.

If the user clicks on the grey portion of the display frame 602BE, the difference windows 610B is shown in step 621. In the difference window 610B, the key differences in the panels 611AE/611BE are that the payload size is different 20 bytes versus 1026 bytes and that the destination IP address is different. This could indicate that the source device may have been compromised, may have a configuration error, may have a failure, and/or a related issue.

The user can also select specific headers/protocols that are displayed using the filter options selector 630. The filter options selector 630 allows the user to filter different layers. For example, the user may select to only see application layer data to see a specific protocol (e.g., DNS). For example, in an enterprise one would expect to see all DNS communications going to a fixed set of internal DNS servers, but that may not always be the case. There may be attempts to resolve IP addresses or hostnames via protocols other than DNS (e.g., LLMNR or MDNS or NetBios), so one could monitor for all such protocols and then have the system analyze those. There are also risks of data exfiltration via DNS that can be captured using the data analytics.

While only two video flows 601A-601B are shown in FIG. 6, there may be more than two video flows 601 shown. For example, the user interface 600 may have a scroll bar that allows a user to scroll video flows 601 as they occurred over time to see any differences.

In one embodiment, one of the video flows 601 may be from the malicious flow database 141. Thus, a user can determine how a particular video flow 601 compares to a known malicious video flow. Here, the malicious flow database 141 is used to identify specific flows that are known (e.g., associated with a specific type of known malware).

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22nm Haswell, Intel® Core® i5-3570K 22nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments , configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
receive a plurality of captured packets, wherein the plurality of captured packets are from a plurality of packet flows;
sort the plurality of captured packets into individual packet flows;
convert the individual packet flows into individual videos comprising a plurality of video frames by mapping bytes of one or more packets in each individual packet flow into corresponding pixels of one or more video frames; and apply a machine learning algorithm to the individual videos to classify the individual videos, wherein video frames in the individual videos comprise metadata and wherein the metadata comprises one or more off a source IP address, a destination IP address, a source port number, a destination port number, a type of frame, a multiple frame packet indicator, a packet number, a cryptographic hash offset, failure information, packet header locations, an event, a Media Access (MAC) address, and a network address.

2. The system of claim 1, wherein classifying the individual videos comprise one or more of:

clustering the individual videos;

identifying an anomaly in a specific individual video;

identifying similar individual videos; and training the machine learning model.

3. The system of claim 1, wherein converting the individual packet flows into the individual videos comprises: placing all bytes of each packet in each of the individual packet flows to create each of the individual videos.

4. The system of claim 3, wherein each byte of each packet in the individual packet flows is represented as a corresponding pixel in an induvial video frame.

5. The system of claim 3, wherein each protocol header starts in a fixed location in each video frame in the individual videos.

6. The system of claim 1, wherein converting the individual packet flows into the individual videos comprises a coarse transformation that only discriminates between header and payload information.

7. The system of claim 1, wherein converting the individual packet flows into individual videos comprises a medium transformation that uses pooling to convert the individual packet flows into the individual videos.

8. The system of claim 1, wherein converting the individual packet flows into individual videos comprises a video summarization.

9. The system of claim 1, wherein one or more of the classified individual videos are displayed visually to a user.

10. The system of claim 9, wherein individual headers and/or a payload are displayed to the user in different colors and/or grey scale for identifying differences between the individual videos.

11. The system of claim 9, wherein the user can select individual headers and/or payload and wherein the selection causes the individual headers and/or payload to be converted back to original packet data for display.

12. The system of claim 1, wherein a first individual video is compared to a second individual video and wherein the second individual video is retrieved from a malicious flow database.

13. The system of claim 1, wherein the metadata comprises a plurality of: a source IP address, a destination IP address, a source port number, a destination port number, a type of frame, a multiple frame packet indicator, a packet number, a cryptographic hash offset, failure information, packet header locations, an event, a Media Access (MAC) address, and a network address.

14. A method comprising:

receiving, by a microprocessor, a plurality of captured packets, wherein the plurality of captured packets are from a plurality of packet flows;

sorting, by the microprocessor, the plurality of captured packets into individual packet flows;

converting, by the microprocessor, the individual packet flows into individual videos, wherein converting the individual packet flows into the individual videos comprises one or more of a coarse transformation that only discriminates between header and payload information and a medium transformation that uses pooling to convert the individual packet flows into the individual videos; and applying, by the microprocessor, a machine learning algorithm to the individual videos to classify the individual videos, wherein one or more of the classified individual videos are displayed visually to a user.

15. The method of claim 14, wherein converting the individual packet flows into the individual videos comprises: placing all bytes of each packet in each of the individual packet flows to create each of the individual videos and wherein each byte of each packet in the individual packet flows is represented as a pixel in an individual video frame.

16. The method of claim 15, wherein video frames in the individual videos comprise metadata, and wherein the metadata comprises one or more of: a source IP address, a destination IP address, a source port number, a destination port number, a type of frame, a multiple frame packet indicator, a packet number, a cryptographic hash offset, failure information, packet header locations, an event, a Media Access (MAC) address, and a network address.

17. The method of claim 14, wherein converting the individual packet flows into the individual videos comprises the coarse transformation that only discriminates between header and payload information.

18. The method of claim 14, wherein converting the individual packet flows into individual videos comprises the medium transformation that uses pooling to convert the individual packet flows into the individual videos.

19. The method of claim 14, wherein converting the individual packet flows into individual videos comprises a video summarization.

20. A non-transient computer readable medium having stored thereon instructions that cause a processor to execute a method, the method comprising instructions to:

receive a plurality of captured packets, wherein the plurality of captured packets are from a plurality of packet flows;

sort the plurality of captured packets into individual packet flows;

convert the individual packet flows into individual videos, wherein converting the individual packet flows into individual videos comprises a video summarization; and apply a machine learning algorithm to the individual videos to classify the individual videos, wherein the converting of the individual packet flows into individual videos comprises at least one of the following:

a coarse transformation that only discriminates between header and payload information;

a medium transformation that uses pooling to convert the individual packet flows into the individual videos; and a video summarization.

* * * * *